United States Patent [19]

Tanigawa et al.

[11] Patent Number: 5,694,544
[45] Date of Patent: Dec. 2, 1997

[54] CONFERENCE SUPPORT SYSTEM WHICH ASSOCIATES A SHARED OBJECT WITH DATA RELATING TO SAID SHARED OBJECT

[75] Inventors: Yoshinobu Tanigawa, Yokohama; Yoshiyuki Nakayama, Kawasaki; Takeshi Ishizaki, Sagamihara; Masami Kameda, Yokohama, all of Japan

[73] Assignee: Hitachi, Ltd., Tokyo, Japan

[21] Appl. No.: 497,373

[22] Filed: Jun. 30, 1995

[30] Foreign Application Priority Data

Jul. 1, 1994 [JP] Japan ................................. 6-150791

[51] Int. Cl.$^6$ ................... G06F 13/00; G06F 3/14
[52] U.S. Cl. ................ 395/200.04; 395/330; 395/331; 395/332; 395/346; 395/793; 370/260
[58] Field of Search .................. 395/200.04, 200.08, 395/330, 331, 332, 340, 347, 350, 793, 346; 345/1, 2, 119, 157, 162, 901, 902; 370/260, 261, 266, 263, 265

[56] References Cited

U.S. PATENT DOCUMENTS

| | | | |
|---|---|---|---|
| 4,970,678 | 11/1990 | Sladowski et al. | 395/793 |
| 4,974,173 | 11/1990 | Stefik et al. | 395/331 |
| 4,992,972 | 2/1991 | Brooks et al. | 395/338 |
| 5,008,853 | 4/1991 | Bly et al. | 395/337 |
| 5,179,650 | 1/1993 | Fukui et al. | 395/148 |
| 5,280,583 | 1/1994 | Nakayama et al. | 395/200.04 |
| 5,339,389 | 8/1994 | Bates et al. | 395/331 |
| 5,341,293 | 8/1994 | Vertelney et al. | 395/792 |
| 5,418,908 | 5/1995 | Keller et al. | 395/200.01 |
| 5,515,491 | 5/1996 | Bates et al. | 395/331 |
| 5,546,521 | 8/1996 | Martinez | 395/338 |
| 5,577,188 | 11/1996 | Zhu | 395/326 |
| 5,632,009 | 5/1997 | Rao et al. | 395/770 |

FOREIGN PATENT DOCUMENTS 2-176976  7/1990  Japan.

*Primary Examiner*—Meng-Ai T. An
*Attorney, Agent, or Firm*—Antonelli, Terry, Stout & Kraus LLP

[57] ABSTRACT

A conference support system includes a plurality of computers provided with a graphical user interface (GUI) system and connected by a communication network. Each computer includes a storage section having an area in which a drawing object, such as graphics, characters or the like drawn on a partial screen area shared through the communication network by access by user to the shared partial screen area and comment data concerning the drawing object are stored in association with each other, and a display control module by which the drawing object and the comment data associated with each other and stored in the storage section are displayed on a display section in association with each other, whereby a conference by users with each other can be conducted in such a manner that an individual intention for the drawing object is clearly given to participants in real time while accessing the shared partial screen area such as a shared window.

17 Claims, 19 Drawing Sheets

CONFERENCE SUPPORT SYSTEM WHICH ASSOCIATES A SHARED OBJECT WITH DATA RELATING TO SAID SHARED OBJECT

CROSS-REFERENCE TO RELATED APPLICATIONS

This application relates to U.S. Ser. No. 07/938,593 filed on Sep. 3, 1992, now U.S. Pat. No. 5,280,583 which is a continuation of U.S. Ser. No. 350,850 filed on May 12, 1989 now abandoned, and JP-A-2-176976 published on Jul. 10, 1990 assigned to the present assignee.

BACKGROUND OF THE INVENTION AND RELATED ART

The present invention relates to a conference support system comprising a plurality of computers connected by a communication network and having a multi-window system function in which users perform a conferential or collaborative work (hereinafter referred to as conference) with each other in real time while accessing a shared partial screen area such as a shared window.

Techniques for associating data with a drawing object on a shared area exist as techniques relating to a conference support system in which a conference is conducted between a plurality of computers connected by a communication network while accessing a shared partial screen area such as a shared window. The existing techniques include a technique in which additional information is written in the vicinity of a drawing object as in NEC's MERMAID (see CSCW 90 Proceedings pp. 26-39, esp. page 34) and a technique in which comments or memorandum are written in an unshared private partial screen area as in Intel's ProShare (see PC WORLD, March 1994 pp. 66-68, esp. page 68).

SUMMARY OF THE INVENTION

In the above prior art, no system makes the association of data with the drawing object and a human or user only understands the association while seeing the drawing object and the data. Accordingly, there is a problem that it is difficult to clearly give an individual intention for the drawing object to the other participants.

Also, since it is not possible to well reserve the declaration of intention for such a drawing object, there is a problem that when the reference to the result of the previous conference is made again, incidental data such as comments or memorandum for the drawing object at the time of that conference is difficult to be used in a clear form.

An object of the present invention made for solving the above problems of the prior art is to provide a conference support system comprising a plurality of computers connected by a communication network and having a multi-window system function in which a conference by users with each other can be conducted in such a manner that an individual intention for a drawing object is clearly given to the other participants in real time while accessing a shared partial screen area such as a shared window.

Another object of the present invention is to provide a conference support system comprising a plurality of computers connected by a communication network and having a multi-window system function in which each user can clearly give his or her individual intention for a drawing object to the other participants in real time while accessing a shared partial screen area such as a shared window and in which incidental data such as comments or memorandum for the drawing object at the time of a conference can be used in a clear form.

To that end, the present invention provides a conference support system comprising a plurality of computers provided with a graphical user interface (GUI) system and connected by a communication network, wherein each of the plurality of computers includes a storage section having an area in which object data such as graphics, characters or the like drawn on a partial screen area shared through the communication network by access by a user to the shared partial screen area and data relating to the object data are stored in association with each other, and a display control module for displaying the object data and the data relating thereto, which are stored in the storage section, on a display section of each of the plurality of computers in association with each other.

In each of the plurality of computers in the above-mentioned conference support system, the display control module can make a control so that the data associated with the object drawn on the shared partial screen area is displayed on an area of the display section different from the shared partial screen area. In each of the plurality of computers in the conference support system, the display control module can make a control so that the data associated with the object drawn on the shared partial screen area is displayed on an area of the display section different from the shared partial screen area and the object and the display area of the data associated with the object are displayed in a form linked by a visual figure. In the conference support system, the data associated with the object drawn on the shared partial screen area can be changed over between a condition in which the plurality of computers interlock with each other and a condition in which the plurality of computers do not interlock with each other.

Also, the present invention provides a conference support system comprising a graphical user interface (GUI) system such as a window system formed by a plurality of computers connected by a communication network, wherein each of the plurality of computers is provided with display means for displaying a common image on a screen area shared through the communication network, designating means for designating an object such as graphics, characters or the like displayed on the shared screen area of the display means, inputting means for inputting comment data relating to the object designated by the designating means, and storing means for storing the comment data inputted by the inputting means in correspondence with the object designated by the designating means, whereby the object and the comment data stored in the storing means are used in common through the communication network and graphic data indicating the object in association with the object is used in common through the communication network.

In each of the plurality of computers in the above-mentioned conference support system, the comment data can be edited. In each of the plurality of computers in the conference support system, the graphic data can be edited.

Further, the present invention provides a conference support system in which the data associated with each other can be reserved and means for enabling an operation for edition of the data is provided.

Namely, the present invention provides a conference support system which comprises a graphical user interface (GUI) system such as a window system formed by a plurality of computers connected by a communication network and is formed by a computer system having means for allowing a user to access a shared partial screen area such as a shared window in real time on the plurality of computers to draw an object such as graphics, characters or the like on the shared area in an overlapping form and for associating data or a data display operation program with the drawn object.

In the above-mentioned conference support system, the data associated with the object drawn in the shared partial screen area is displayed in an area on said display section different from the shared area. The area displaying the data associated with the object may be a window.

With the above construction, each computer in a conference support system comprising a plurality of computers connected by a communication network has a table which represents the association a drawing object in a shared screen such as a shared window and data to be associated with the drawing object. Therefore, an operation such as the display of the associated data in accordance with each drawing object becomes possible, thereby making it possible to conduct a conference through the communication network.

With the above construction, in a conference support system comprising a plurality of computers connected by a communication network and having a multi-window system function, it is possible for users to conduct a conference in such a manner that an individual intention for a drawing object is clearly given to the other participants in real time while accessing a shared partial screen area such as a shared window.

With the above construction, in a conference support system comprising a plurality of computers connected by a communication network and having a multi-window system function, each user can clearly give his or her individual intention for a drawing object to the other participants in real time while accessing a shared partial screen area such as a shared window and incidental data such as comments or memorandum for the drawing object at the time of a conference can be used in a clear form.

With the above construction, in a conference support system comprising a plurality of computers connected by a communication network and having a multi-window system function, the use of control means for associating data with an object drawn in a shared screen such as a shared window and means for displaying, editing and reserving the data makes it possible to clearly represent incidental data such as comments or memorandum for a drawing object in the shared window at the time of a conference or after the conference.

DESCRIPTION OF THE PREFERRED EMBODIMENTS

An embodiment of the present invention will now be explained by use of the accompanying drawings in conjunction with a conference support system provided with a shared window which makes it possible to share the same screen. In the following, a "conference for document production" will be taken as an example of a conferential or collaborative work performed by the conference support system.

Figure 1:
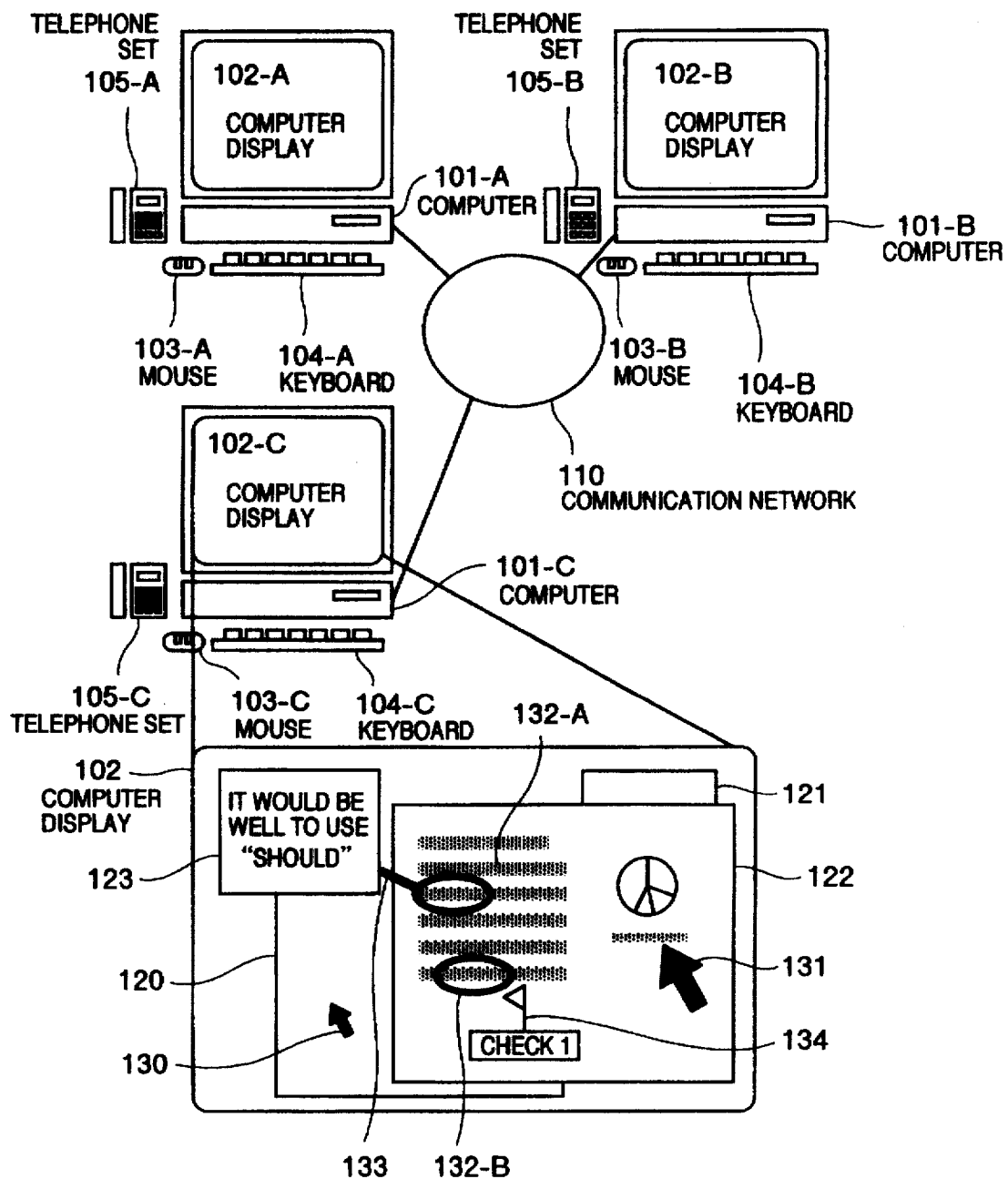
FIG. 1 is a diagram showing an embodiment of the whole construction of a conference support system according to the present invention.

The construction of a conference support system using the present invention is shown in FIG. 1 together with a display example on a screen. The present system is composed of a computer 101 (101-A, 101-B, 101-C), a computer display 102 (102-A, 102-B, 102-C) provided with a graphical user interface (GUI) for displaying the result of processing by the computer, an input device including a mouse 103 (103-A, 103-B, 103-C) and a keyboard (104-A, 104-B, 104-C), a telephone set 105 (105-A, 105-B, 105-C), and a communication network 110 to which the computer 101 and the telephone set 105 are connected.

In this conference support system, a worker of, for example, on the computer 101-A side inputs a document from document input means such as the keyboard 104 by use of a private window 120 which is a personal working environment. The document is stored into a memory 212 (see FIG. 2). Further, the worker makes a draft of document while displaying the document stored in the memory 212 in the private window 120 on the display 102 on the basis of a display control program or module. Next, the computer 101-A calls to the computers 101-B and 101-C on the other participant side or the conferee side through the communication network 110 by use of the telephone set 105-A to inform them of the start of a conference. And, the computer 101-A transmits the produced draft of document through the communication network 110 to the computers 101-B and 101-C which are the conferees or the other participants in the conference. Each of the computers 101-A, 101-B and 101-C displays the transmitted or received draft of document in a shared window 122 by use of the function of a conference control window 121 to enable the conference.

The conference in the conference support system is performed by a voice communication through the telephone set 105 and a visual communication through access to an image on the shared window 122.

On the computer display 102 of each computer under the electronic conference are displayed various windows including the shared window 122 which makes it possible to share the same screen, the conference control window 121 which is provided with an interface for controlling the shared window and the conference itself, and the private window 120 which is an unshared window for performing a personal work (and in which a document produced by an individual and stored in the memory is displayed prior to the start of the conference, as mentioned above). A shared image of document for performing the conference is displayed on the shared window 122. A mouse cursor 130 interlocking with the mouse 103 as one input means is displayed on the computer display 102 of those ones of the computers under the conference which are required.

A pointer 131 for directing the participants' attention to a partial region of the shared window 122 and a drawing object 132 (132-A, 132-B) written by the participant exist on the shared window 122 of the computer display 102 of each computer under the conference.

Data can be associated with the drawing object 132 in the shared window 122 on the computer display 102 of each computer under the conference. (The associated data will be referred to as comment data.) In the shown example, text data is taken as an example of the comment data. The comment data may be voice data, still picture data, motion picture data or the like. Under the conference, the comment data for the drawing object 132-A is displayed by a comment window 123. In the shown example, the data text of IT WOULD BE WELL TO USE "SHOULD" is displayed. Also, the comment window 123 accepts comment data 350 (see FIG. 3). The drawing object 132 and the comment window 123 are linked by a visual figure (or a link line 133 in the shown example).

In the case where the drawing object 132 includes comment data when the comment window 123 is not displayed under the conference, graphic data (hereinafter referred to as marker) can be displayed in the vicinity of the drawing object 132. A marker 134 (see 360 in FIG. 5) is associated with the drawing object 132-B. A name can be given to marker data. For example, the marker 134 is named "CHECK 1", "CORRECTION 5" or "SEE 9" and the name is displayed.

Figure 2:
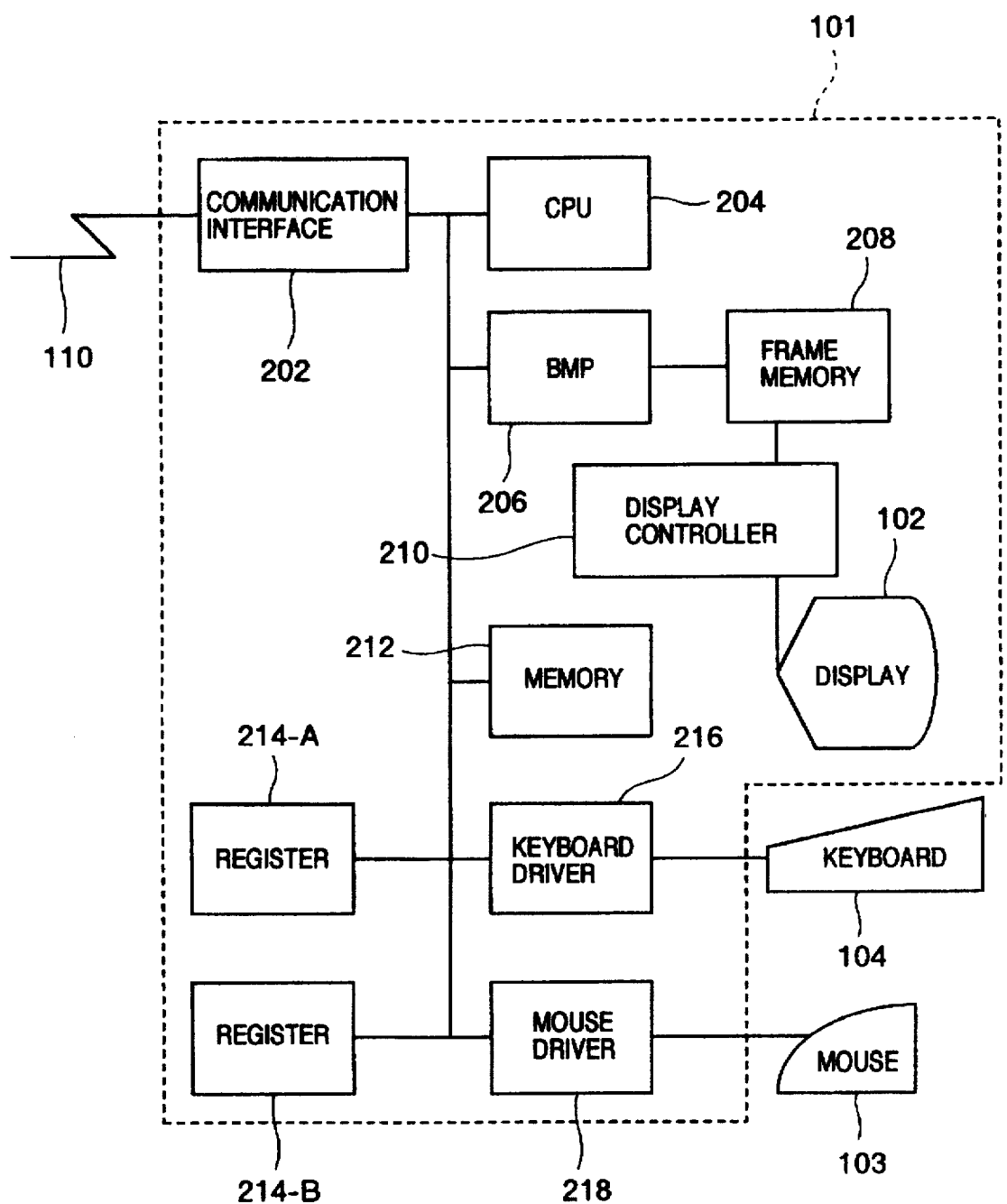
FIG. 2 is a block diagram showing the hardware construction of each computer forming the conference support system according to the present invention.

FIG. 2 is a block diagram showing the basic construction of each computer 101 which forms the conference support system. In FIG. 2, reference numeral 212 denotes a memory for storing a conference control program, comment data 350, marker data 360 and so forth. Numeral 204 denotes a central processing unit (CPU) by which a data processing is performed in accordance with a program instruction read from the memory 212, and numeral 206 denotes a bit map processor (BMP) by which contents to be outputted to the display 102 are written as image data into a frame memory 208 in accordance with the program instruction read from the memory 212. The contents of the frame memory are read by a display controller 210 and then displayed on the display 102. Numeral 216 denotes a keyboard driver by which comment data 350 and marker data 360 inputted from, for example, the keyboard 104 as one input means are stored into a register 214-A. Numeral 218 denotes a mouse driver by which data inputted from the mouse 103 as one input means are stored into a register 214-B. Each computer 101 forming the conference support system is connected through a communication interface 202 to the communication network 110 which may be a wide area network (WAN), an integrated service digital network (ISDN), a local area network (LAN), a fiber distributed data interface (FDDI) or the like. In the present embodiment, the communication network is of a broadcast type.

Figure 3:
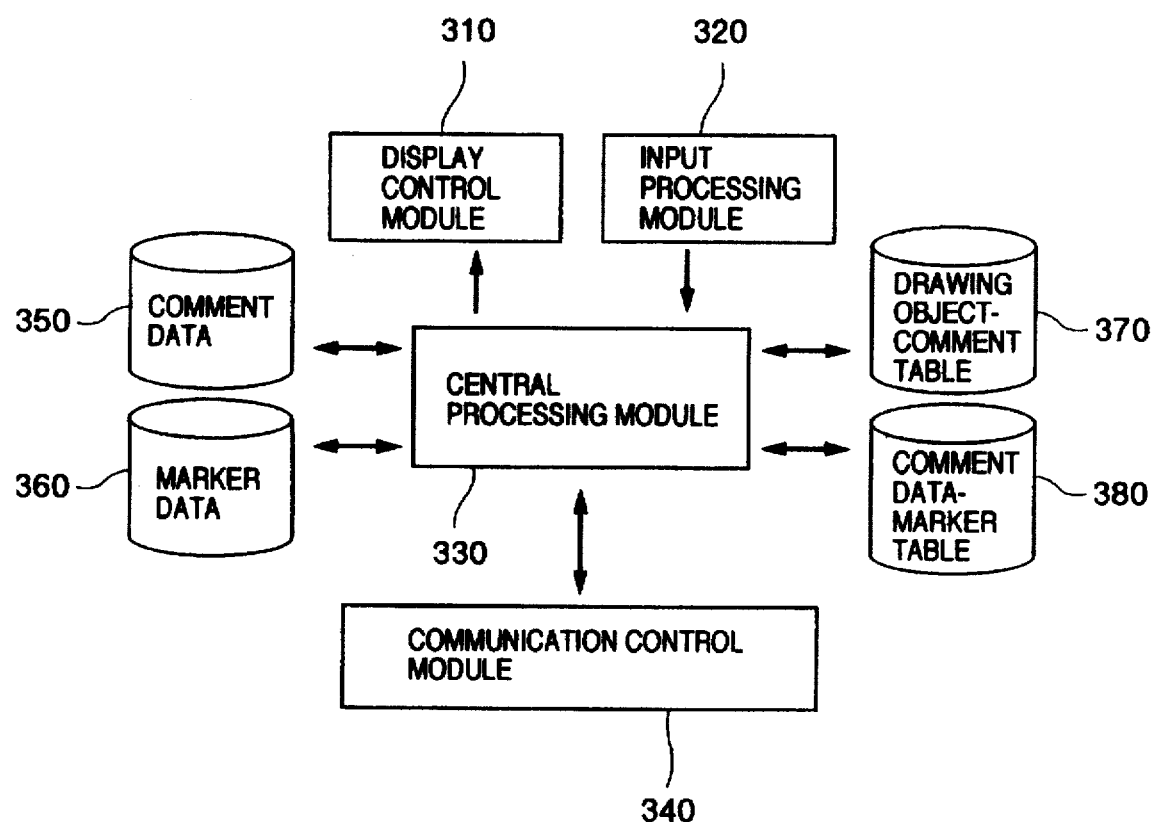
FIG. 3 is a block diagram showing the construction of a processing program concerning comment data and marker data in each computer forming the conference support system according to the present invention.

FIG. 3 shows the construction of programs stored in the memory 212 shown in FIG. 2 and attendant upon comment data displayed on the comment window 123 for the drawing object 132 which is drawn on the shared window 120 of the conference support system according to the present invention. Reference numeral 310 denotes a display control program or module for performing a processing for display of the shared window 122 and the comment window 123 for a participant. Numeral 320 denotes an input processing program or module for processing an input from the input device 103 or 104 by the participant. Numeral 340 denotes a communication control program or module with which at the time of a conference, the CPU 204 performs the processing of communication of data with a conferee in the conference through the communication interface 202. Numeral 330 denotes a central processing program or module for analyzing data from the input processing module 320 and the communication control module 340. The central processing module 330 manages comment data 350 which is associated with the drawing object 132 and is displayed on the comment window 123 and marker data 360 which is given to the comment data 350 or the drawing object 132. Also, the central processing module 330 manages a drawing object-comment table 370 which shows the association of the comment data 350 with the drawing object 132 and a comment data-marker table 380 which shows the association of the marker data 360 with the drawing object 132.

Figure 4:
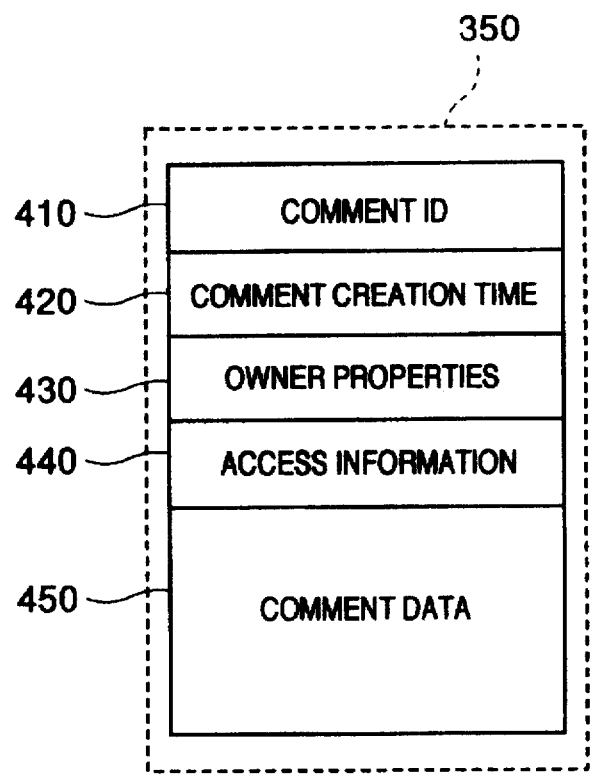
FIG. 4 show a data format of comment date shown in FIG. 3.

FIG. 4 shows the data format of comment data 350 associated with a drawing object and stored in the drawing object-comment table 370 shown in FIG. 3. The comment data 350 is composed of comment ID 410 for distinguishing a plurality of comments, comment creation time 420 for storing time information such as the time (or the date and hour) of creation or input of a comment, owner properties 430 for storing information of a comment creator, access information 440 for storing information as to whether or not it is possible for the comment creator or another person to view or edit the comment, and comment data 450 for storing the inputted comment.

Figure 5:
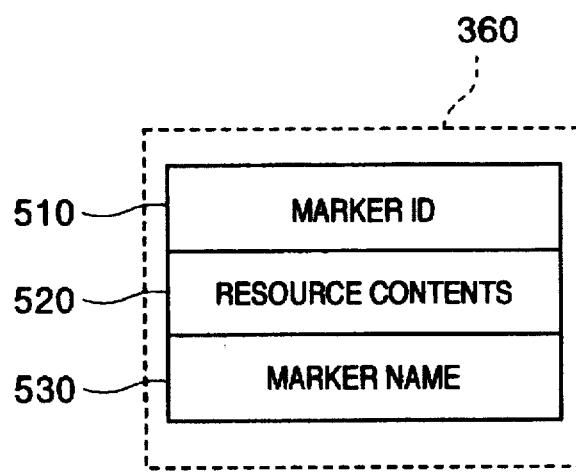
FIG. 5 shows a data format of marker data shown in FIG. 3.

FIG. 5 shows the data format of marker data 360 associated with comment data 350 or a drawing object 132 and stored in the comment data-marker table 380 shown in FIG. 3. The marker data 360 is composed of marker ID 510 for distinguishing a plurality of markers, resource contents 520 representing the form or color of a figure as which a marker is displayed on the shared window 122, and marker name 530 representing the name of the marker.

Figure 6:
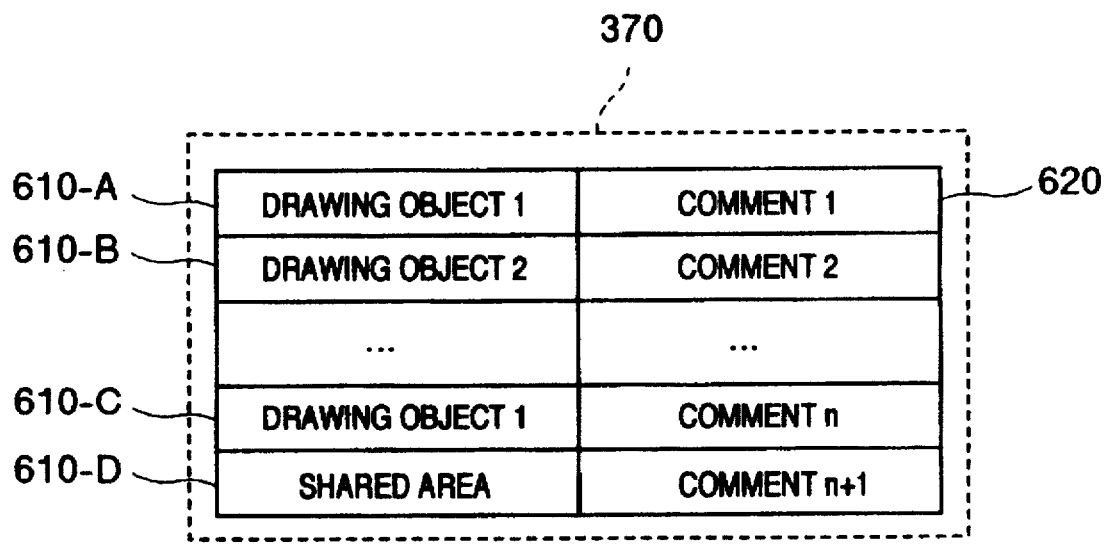
FIG. 6 shows a data format of a drawing object-comment table shown in FIG. 3.

FIG. 6 shows a data format representing the association of comment data 350 with a drawing object 132 and stored in the drawing object-comment table 370 shown in FIG. 3. The data format is composed of data 610 representing a drawing object 132 and comment ID in comment data 350 associated with the data 610. As seen from the examples of 610-A and 610-C, a plurality of comment data (for example, A's comment and C's comment) respectively displayed on a plurality of comment widows 123 can be associated with one drawing object. Thereby, the movement, search or edition for each comment data becomes easy. As seen from 610-D, it is also possible to associate comment data with the shared partial screen area 122 itself. This comment data is common to the whole of the shared partial screen area 122. Thereby, since the comment data common to the whole of the shared partial screen area 122 is given, the search can be made easily by the common comment data.

Figure 7:
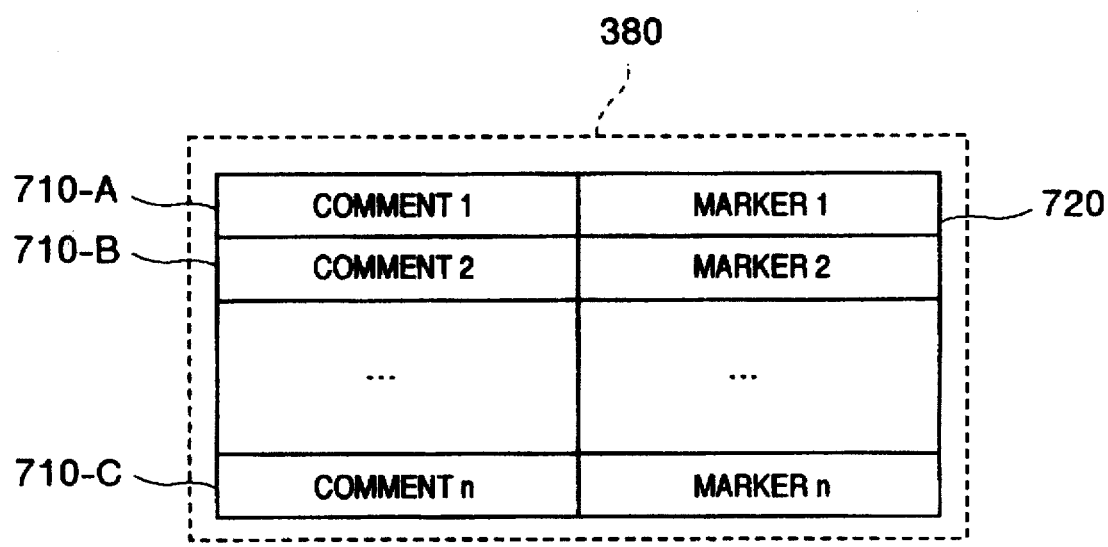
FIG. 7 shows a data format of a comment data-marker table shown in FIG. 3.

FIG. 7 shows a data format indicating the linkage of marker data 360 with comment data 350 or a drawing object 132 and stored in the comment data-marker table 380 shown in FIG. 3. This data format is composed of comment ID 710 in comment data 350 and marker IC 720 in marker data 360.

More particularly, a conference is conducted as follows. The CPU performs a processing on the basis of an instruction from input means such as the mouse 103 and in accordance with a program stored in the memory 212 to make a display on the screen of the display 102 and stores comment data into the drawing object-comment table 370 shown in FIG. 3 and marker data 360 into the comment data-marker table 380 in correspondence to a drawing object. Further, the comment data 350 and the marker data 360 are transmitted through the communication network 110 to the computer 101 on the conferee side so that the comment data 350 and the marker data 360 are stored into the drawing object-comment table 370 and the comment data-marker table 380 of the memory 212 in the computer 101 and are displayed on the display 102.

The example of an operation for display of a comment window 123 for inputting comment data 350 for a drawing object 132 will now be explained using FIGS. 8 and 9.

Figure 8:
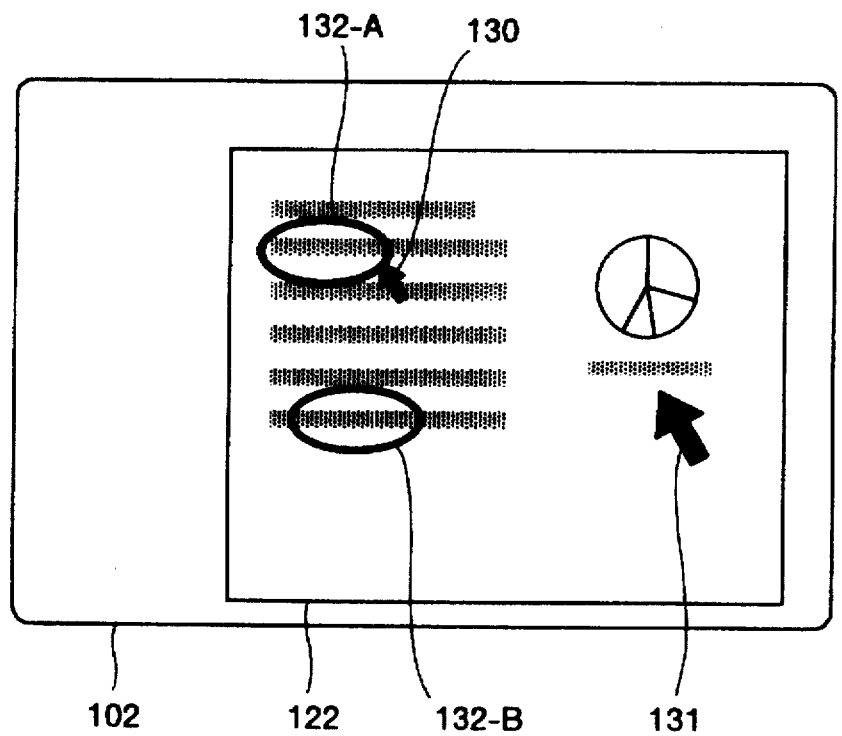
FIG. 8 is a diagram showing the example of a window display operation for input and edition of comment data for a drawing object 132-A in each computer forming the conference support system according to the present invention, the diagram showing that the drawing object is selected.
Figure 9:
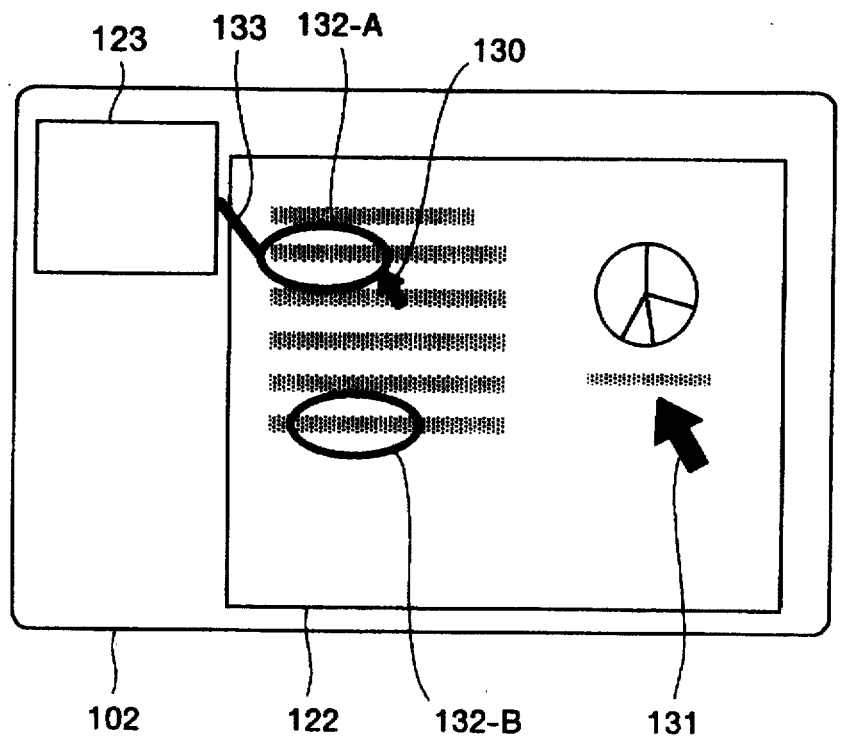
FIG. 9 is a diagram similar to FIG. 8 showing that a comment window is displayed.

In FIG. 8, the CPU 204 of a desired computer 101 processes inputs from the input devices 103 and 104 in accordance with an input processing module 320 stored in the memory 212 and displays a shared window 122 on the computer display 102 on the basis of a display control module 310 stored in the memory 212. Further, a pointer 131 is written into the shared window 122 and a drawing object 132 (132-A, 132-B) is written for a document image on the shared window 122. A mouse cursor 130 is used to display a comment window 123 on an area different from the shared window 122 through a processing similar to the above-mentioned processing. For example, a comment window 123 shown in FIG. 9 is displayed by placing the mouse cursor 130 upon the drawing object 132-A of interest and depressing the button of the mouse 103 continuously two times at a sufficiently high speed. (Hereinafter, to depress the button of the mouse 103 continuously two times at a sufficiently high speed will be referred to as double-click by the mouse 103.) At this time, the drawing object 132-A and the comment window 123 are linked by a visually represented figure. In the shown example, the drawing object 132-A and the comment window 123 are linked by a link line 133. The comment window 123 may be realized as a modeless window. Namely, even unless the comment window 123 is closed, the shared window 122 can be subjected to, for example, a work such as the drawing of an object. The comment window 123 may be realized as a modal window. Namely, unless the comment window 123 is closed, it is not possible to conduct a work such as the drawing of an object on the shared window 122.

Figure 10:
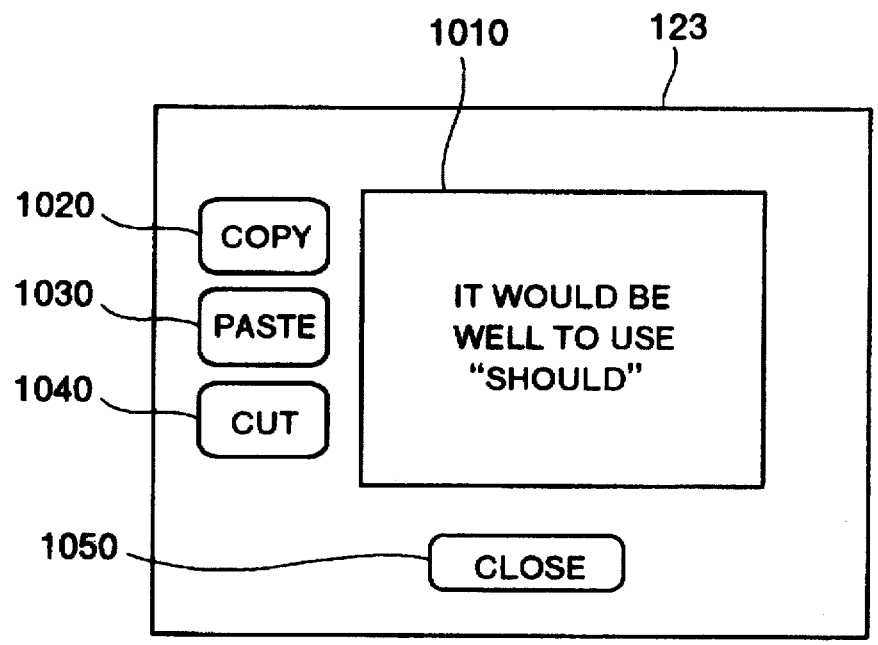
FIG. 10 is a diagram showing the comment window in each computer forming the conference support system according to the present invention.

FIG. 10 shows the display construction of the comment window 123 in a desired computer 101.

Reference numeral 1010 denotes a region for effecting the display of comment data input or the like after an edit operation. In the shown example, the inputted data is a character string. However, the data may be voice, still picture or motion picture. The comment is inputted by the keyboard 104. However, the mouse 103 or a pen input device may be used as input means.

In the region 1010, a part of the displayed comment data can be selected. An example of the selecting operation includes bringing the mouse cursor 130 into the leading character of a character string to be selected to depress the button of the mouse 103 one time at that position, moving the mouse cursor 130 to the last character of the selected character string with the depression of the button of the mouse 103 being kept, and thereafter releasing the button. (Hereinafter, to depress the button of the mouse 103 one time will be referred to as click by the mouse 103, to move the mouse cursor 130 with the depression of the button of the mouse 103 being kept will be referred to as dragging the mouse 103, and to release the mouse button after the dragging of the mouse 103 will be referred to as dropping the mouse 103.)

Numeral 1020 denotes a region for providing a function of copying a part of the data displayed on the region 1010 into the memory 212. Numeral 1030 denotes a region for providing a function of displaying data having been stored in the memory 212 on the region 1010. Numeral 1040 denotes a region for providing a function of copying a part of the data displayed on the region 1010 into the memory 212 and erasing the copied data part from the region 1010. Numeral 1050 denotes a region for providing a function of bringing the comment window 123 into an undisplayed condition. In an example of an operation for using the region 1020, 1030, 1040 or 1050, that region is to subjected to the click by the mouse 103.

Figure 11:
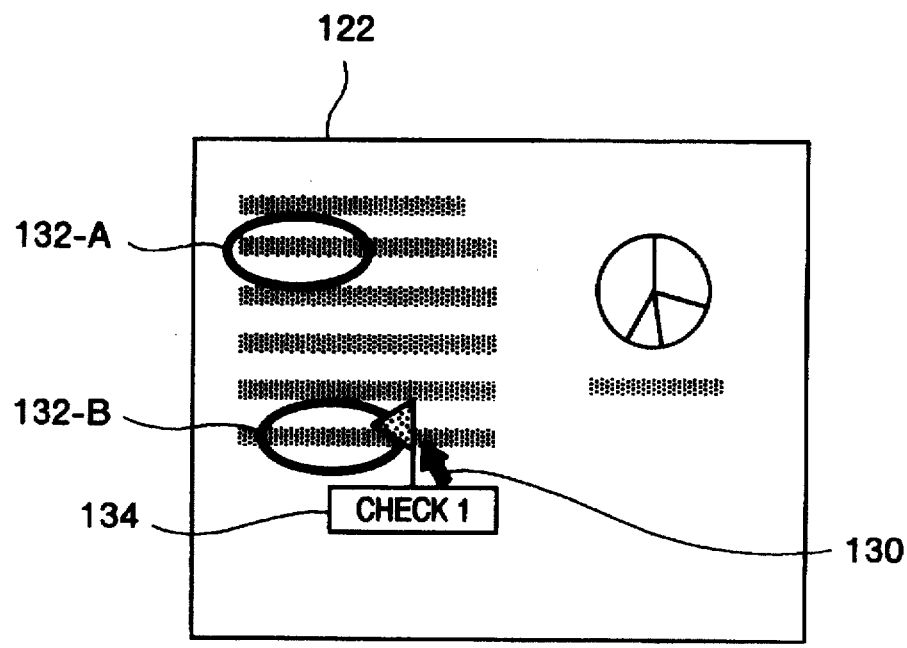
FIG. 11 is a diagram showing the example of an operation for movement of comment data to another drawing object 132-A in each computer forming the conference support system according to the present invention, the diagram showing that a marker is selected.
Figure 12:
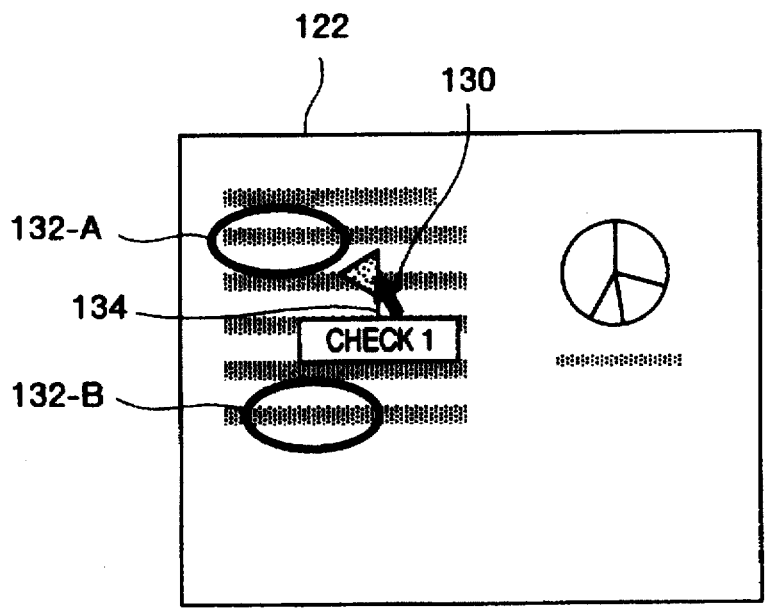
FIG. 12 is a diagram similar to FIG. 11 showing that the marker is being moved.
Figure 13:
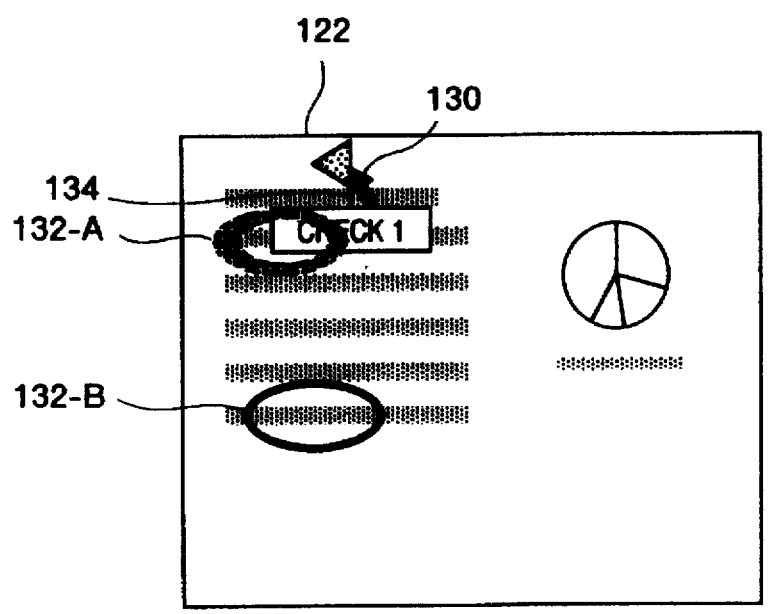
FIG. 13 is a diagram similar to FIG. 11 showing that comment data represented by the marker can be associated with the drawing object 132-A.
Figure 14:
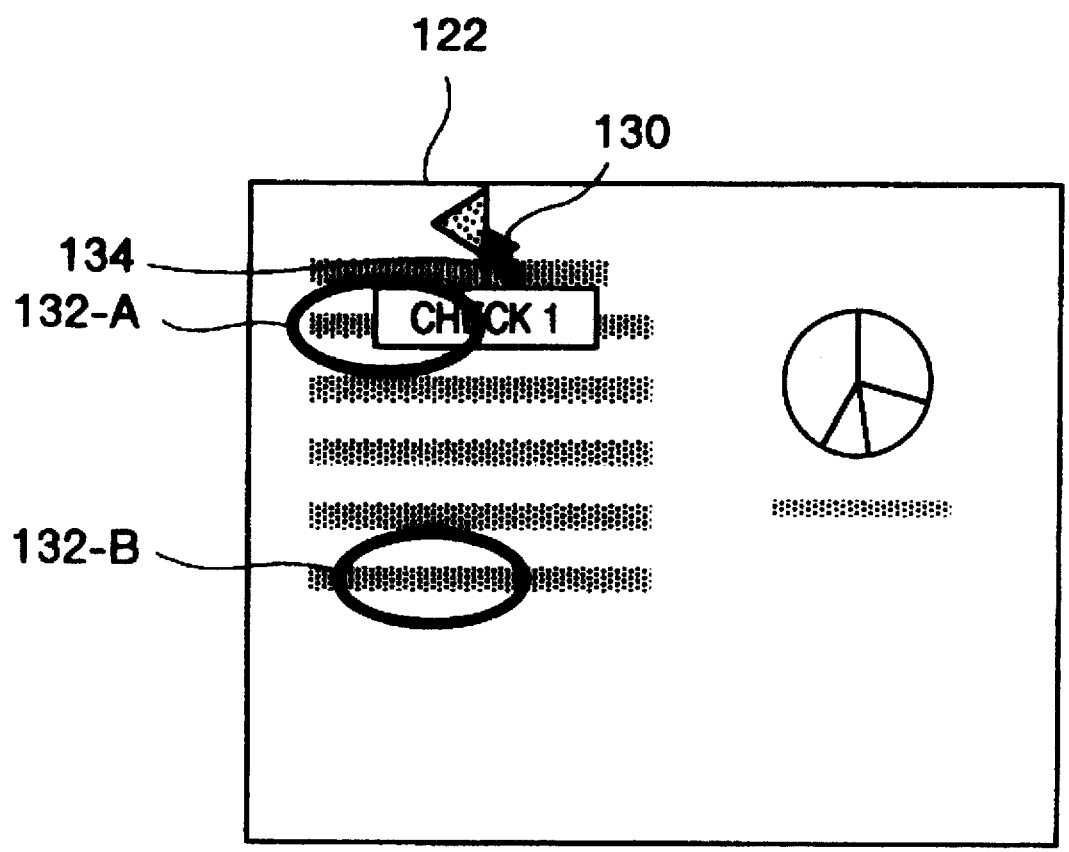
FIG. 14 is a diagram similar to FIG. 11 showing that the comment data represented by the marker is actually associated with the drawing object 132-A.

A series of operations for changing the association of comment data with a drawing object will be explained using FIGS. 11 to 14 in conjunction with an example in which comment data having been associated with the drawing object 132-B is to be associated with the other drawing object 132-A again. FIG. 11 shows the display appearance of a shared window 122 after a marker 134 has been subjected to the click by the mouse 103. The movability of the marker 134 is represented by changing the color of a part of the marker 134. The movability of the marker 134 may be represented by flickering a part of the marker 134, changing the form of the marker or generating voice. In an example of the moving operation, the marker 134 is dragged by the mouse 103, as shown in FIG. 12. By changing the color of the part of the marker 134 during the dragging, it is represented that the marker 134 is being moved. FIG. 13 shows a display appearance when the marker 134 and the drawing object 132-A overlap one another. The color or form of the drawing object 132-A is changed to indicate that the drawing object can be associated with marker data represented by the marker 134. If the mouse 103 is dropped in the state shown in FIG. 13, the marker 134 and the drawing object 132-A are actually associated with each other. The display appearance of the shared window 122 after the association is shown in FIG. 14. In FIG. 14, the drawing object 132-A is restored from the change in color or form and the marker 134 are restored from the change in color.

When the comment data is copied, the marker in the vicinity of the drawing object 132-B in FIG. 11 is not moved and the moving marker 134 in FIG. 12 is the copied one. The example of an operation for distinguishing the moving operation and the copying operation will be mentioned in the following. When the marker 134 is to be moved, the marker 134 is subjected to the click by the mouse 103. When the marker 134 is to be copied, the marker 134 is subjected to the click by the mouse 103 while depressing a shift key on the keyboard 104. It is of course that such a procedure may be set arbitrarily.

Figure 15:
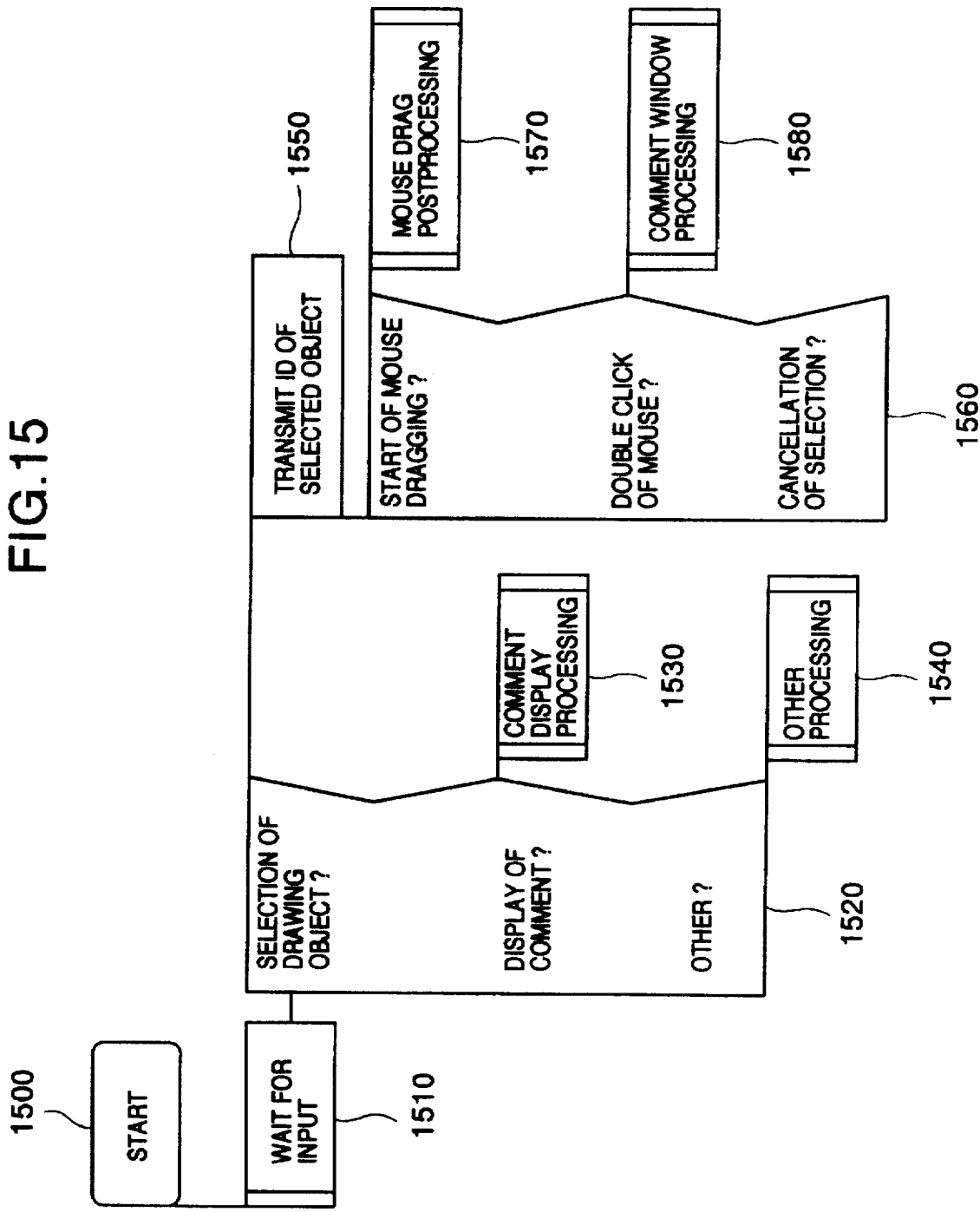
FIG. 15 is a flow chart showing an input processing in a shared window in each computer forming the conference support system according to the present invention.

FIG. 15 is a processing flow chart of a processing attendant upon comment data associated with a drawing object for an input in a shared window.

When a shared window 122 is displayed, a desired computer 101 takes an input waiting condition (step 1510) and judges whether the input is the selection of a drawing object, the display of comment or another input (step 1520).

In the case where a drawing object is selected, ID of the selected drawing object is transmitted (step 1550). Next, the judgement is made of whether the mouse dragging is started, the mouse is double-clicked or the selection is cancelled (step 1560). When the mouse dragging is started, a mouse drag postprocessing is performed (step 1570). When the mouse is double-clicked, a comment window processing is performed (step 1580).

In the case where the display of comment is selected in the judgement in step 1520, a comment display processing is performed (step 1530).

In the case of the other input, a processing corresponding to that input is performed (step 1540).

Figure 16:
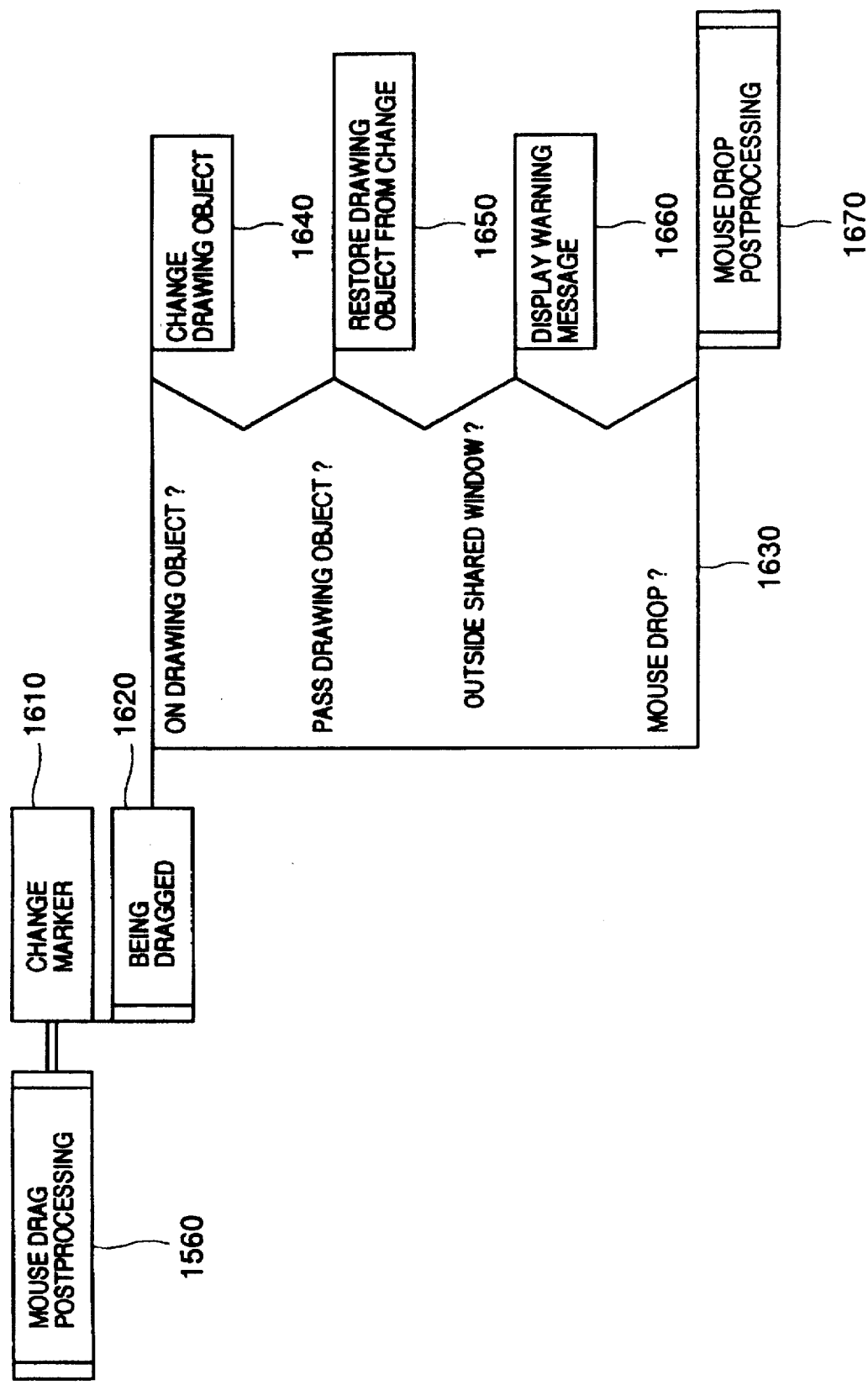
FIG. 16 is a flow chart showing a processing when a marker is moved in each computer forming the conference support system according to the present invention.

FIG. 16 is a flow chart showing a processing performed by the display control module 310 after the marker 134 is subjected to the click by the mouse 103 in FIG. 11.

When the mouse dragging is started, the color of the marker is changed (step 1610). So long as the mouse is being dragged (step 1620), the following judgement is made (step 1630) and the flow proceeds to the corresponding process. Namely, when the mouse cursor 130 is placed on a drawing object 132, the color or form of the drawing object 132 is changed (step 1640).

When the mouse cursor 130 passes the drawing object 132, the drawing object is restored from the change (step 1650).

When the mouse cursor 130 is outside the shared window 122, a warning message is displayed (step 1660). The warning message may be represented by displaying a text, generating voice or changing the color of the screen.

When the mouse is dropped, a mouse drop postprocessing is performed (step 1670).

Figure 17:
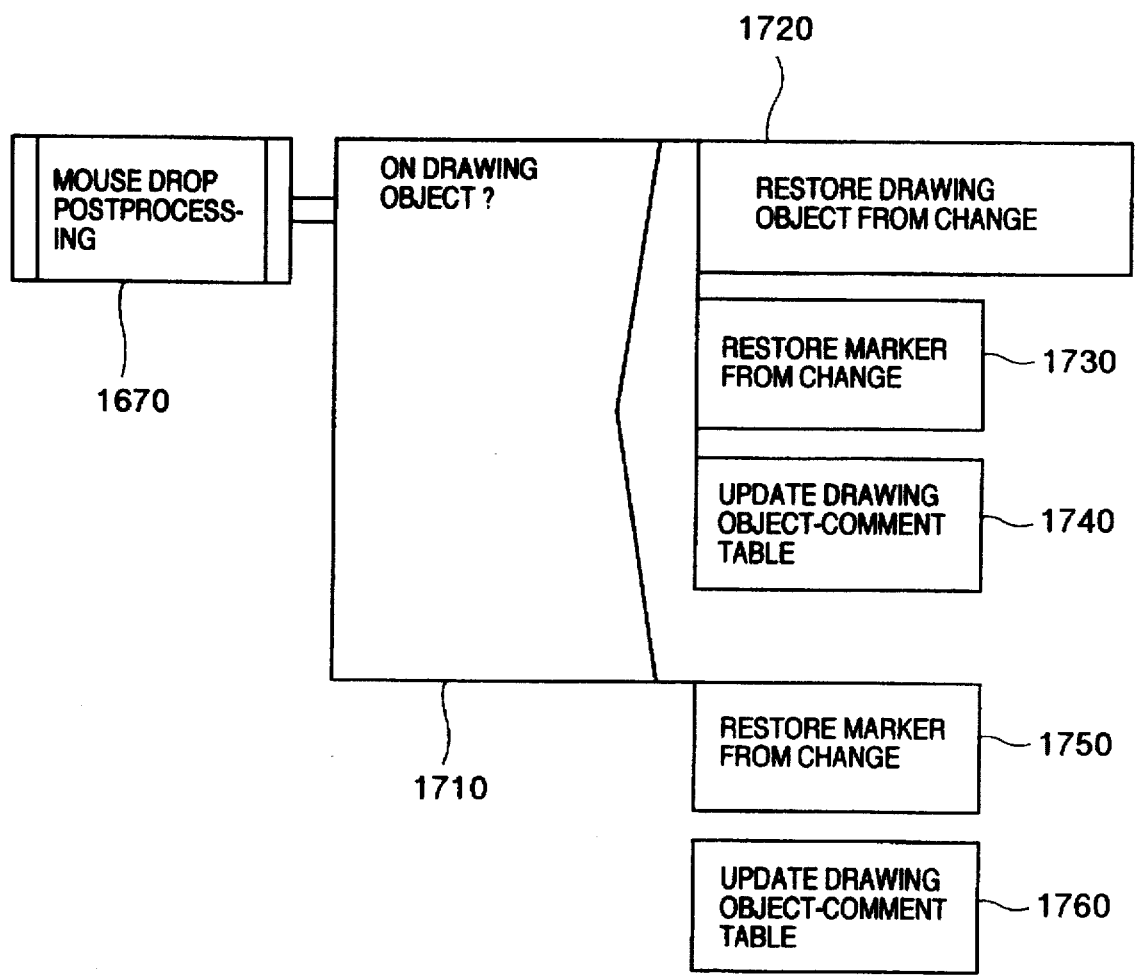
FIG. 17 is a flow chart showing a processing when the marker is dropped by a mouse in each computer forming the conference support system according to the present invention.

FIG. 17 is a flow chart showing a processing performed by the display control module 310 and the central processing module 330 when the marker 134 is placed upon the drawing object 132-A in FIG. 13.

When the mouse 103 is dropped on the drawing object 132-A, the judgement is made of whether or not the mouse cursor 130 is placed on the drawing object 132-A (step 1710). In the case where the mouse cursor is placed on the object, the drawing object 132-A is restored from the change in color or form (step 1720) and the marker 134 is restored from the change (step 1730). Thereafter, the drawing object-comment table 370 is updated (step 1740).

In the case where the mouse cursor 130 is not placed on the drawing object 132-A, the marker 134 is restored from the change (step 1750) and the drawing object-comment table 370 is updated (step 1760). In this case, the comment data is associated with not the drawing object but the shared window.

Figure 18:
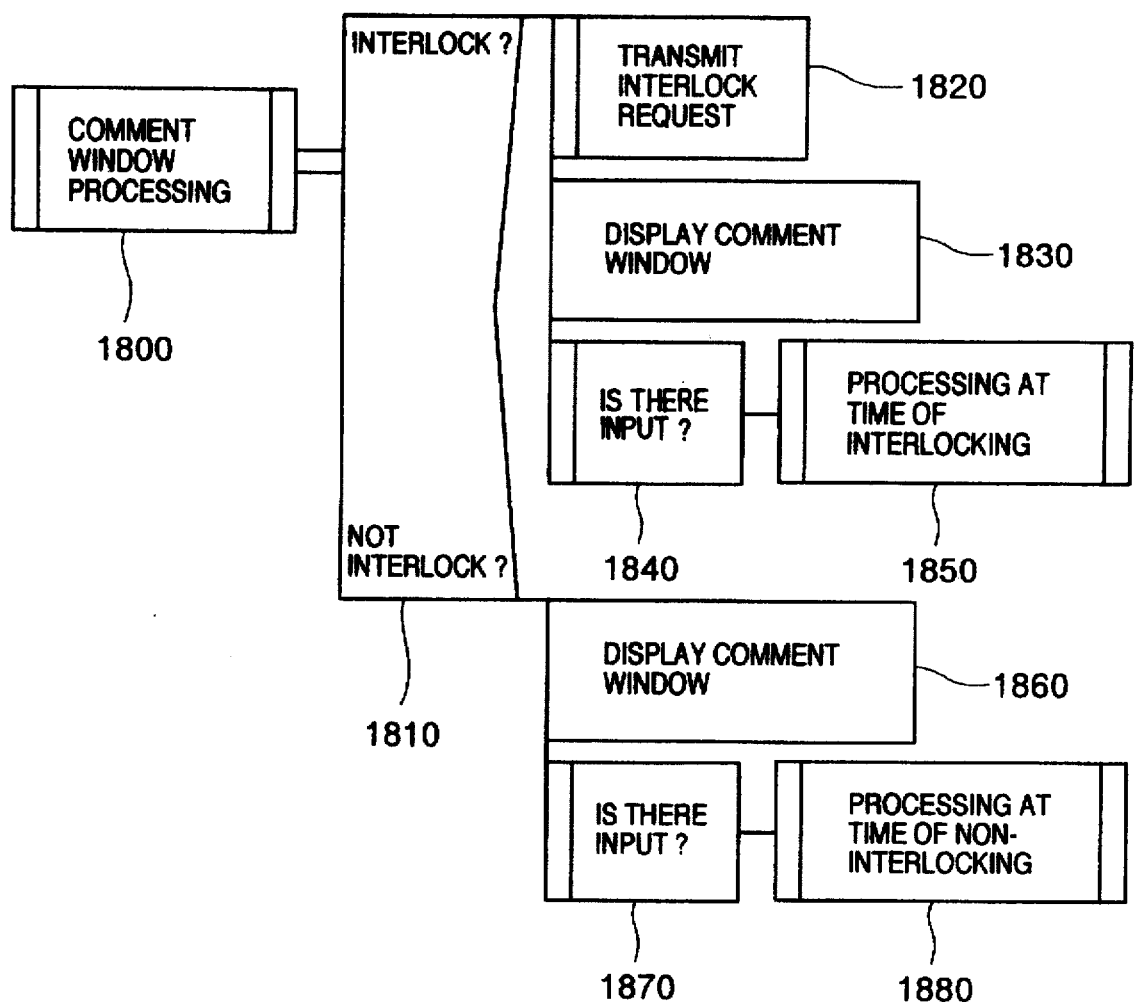
FIG. 18 is a flow chart showing a processing in a comment window in each computer forming the conference support system according to the present invention.

FIG. 18 is a flow chart for explaining a comment window processing 1800 when the comment window 123 is to be displayed. First, the judgement is made of whether or not the operation interlocks with a conferee, that is, the operation of a computer at one location is reflected on a computer on the conferee side in real time through the communication network 110 (step 1810). In the case where a desired computer interlocks with the conferee computer, the desired computer transmits an interlock request to the conferee computer (step 1820).

Next, the desired computer displays a comment window (step 1830). Further, the desired computer waits for an input from a user (step 1840). When there is the input, the desired computer performs a corresponding process at the time of interlocking with the conferee computer (step 1850).

In the case where the desired computer does not interlock with the conferee computer, the desired computer displays a comment window (step 1860). Further, the desired computer waits for an input from a user (step 1870). When there is the input, the desired computer performs a corresponding process at the time of non-interlocking (step 1880).

Figure 19:
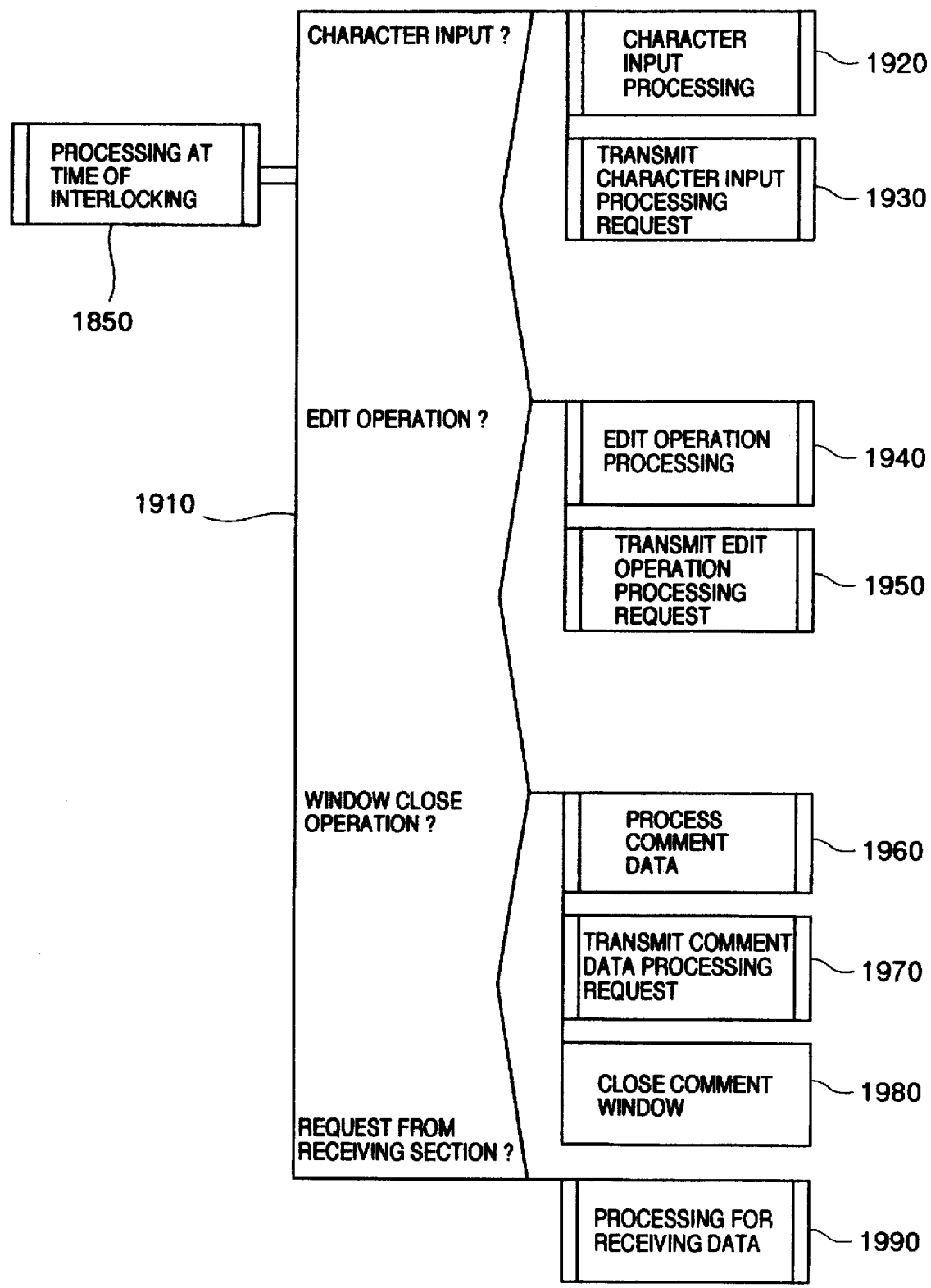
FIG. 19 is a flow chart showing a processing in a comment window when a comment window in each computer forming the conference support system according to the present invention interlocks with a conferee computer.

FIG. 19 is a flow chart for explaining the processing 1850 at the time of interlocking or when the operation of a computer at one location is reflected on a computer on the conferee side in real time through the communication network 110. First, the following judgement in step 1910 is made. In the desired computer, in the case where a character input is made, a character input processing is performed (step 1920) and a character input processing request is thereafter transmitted to the conferee computer (step 1930).

In the case of an edit operation, an edit operation processing is performed (step 1940) and an edit operation processing request is thereafter transmitted to the conferee computer (step 1950). In the case of a window close operation, comment data is first processed (step 1960). Next, a comment data processing request is transmitted to the conferee computer (step 1970). Further, the comment window is closed (step 1980). In the case of a request from a receiving section in the communication control module 340, the received data is processed (step 1990).

Figure 20:
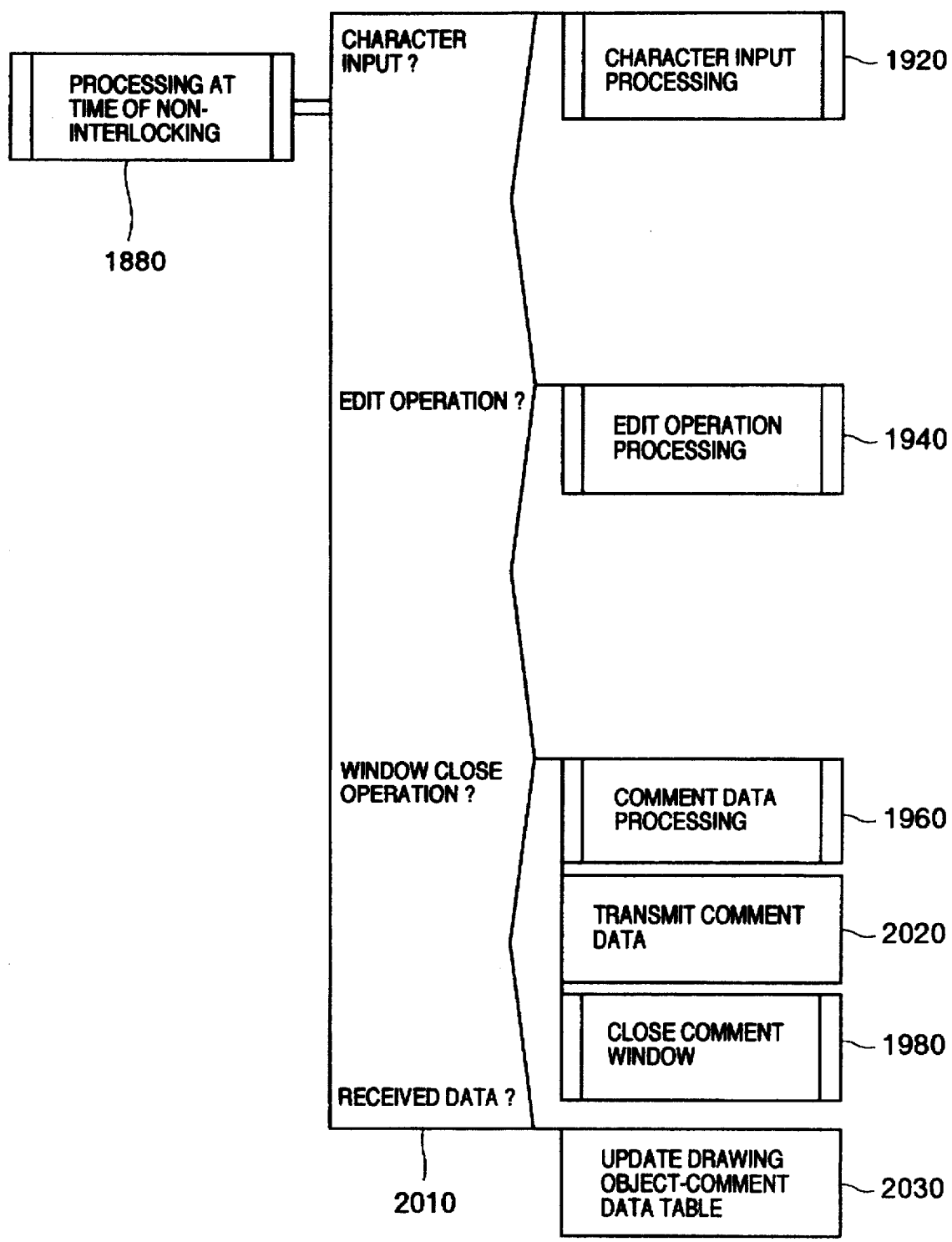
FIG. 20 is a flow chart showing a processing in a comment window when a comment window in each computer forming the conference support system according to the present invention does not interlock with a conferee computer.

FIG. 20 is a flow chart for explaining the processing 1880 at the time of non-interlocking or when the operation of a computer at one location is not reflected on a computer on the conferee side in real time. First, the following judgement in step 2010 is made. In the desired computer, in the case where a character input is made, a character input processing is performed (step 1920). In the case of an edit operation, an edit operation processing is performed (step 1940). In the case of a window close operation, a comment data processing is performed (step 1960). Next, comment data is transmitted to the conferee computer through the communication network 110 (step 2020) and the comment window is closed (step 1980). In the case of received data, the conferee computer updates the drawing object-comment data table 370 in accordance with the received comment data (step 2030).

Figure 21:
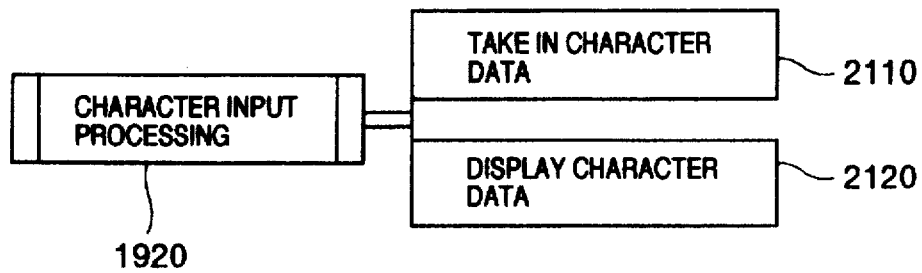
FIG. 21 a flow chart showing a character input processing in a comment window in each computer forming the conference support system according to the present invention.

FIG. 21 is a flow chart for explaining the character input processing 1920 in a desired computer. In the desired computer, character input data is taken in (step 2110) and the character data is displayed for a comment window 123 and a marker name or the like on the display 102 (step 2120).

Figure 22:
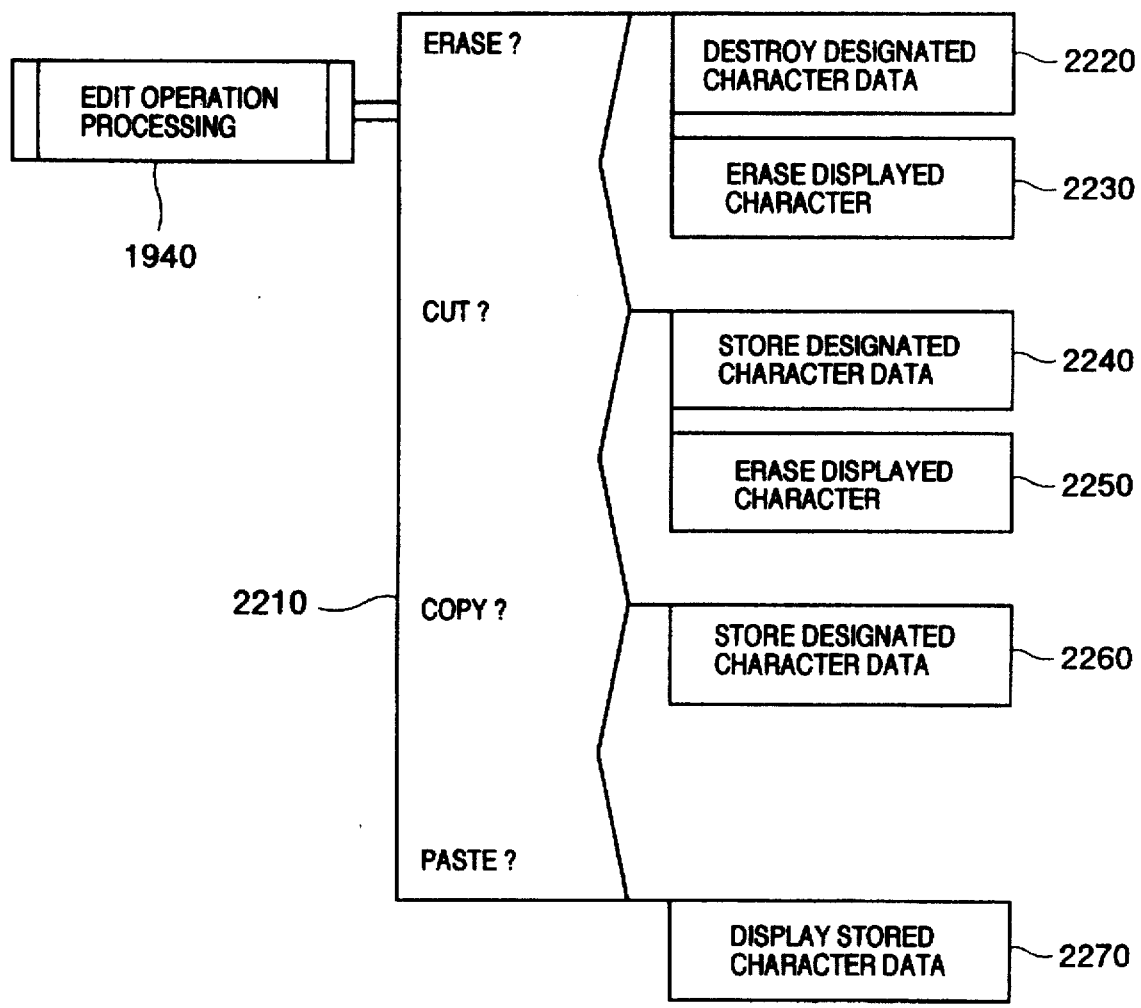
FIG. 22 is a flow chart showing an edit operation processing in a comment window in each computer forming the conference support system according to the present invention.

FIG. 22 is a flow chart for explaining the edit operation processing 1940 in a desired computer. In the desired computer, the following judgement in step 2210 is first made. In the case of an erase operation, designated character data is destroyed (step 2220) and the display of the designated character is erased (step 2230). In the case of a cut operation, designated character data is stored into the memory 212 (step 2240) and the display of the designated character data is erased (step 2250). In the case of a copy operation, designated character data is stored into the memory 212 (step 2260). In the case of a paste operation, character data stored in the memory 212 is displayed (step 2270).

Figure 23:
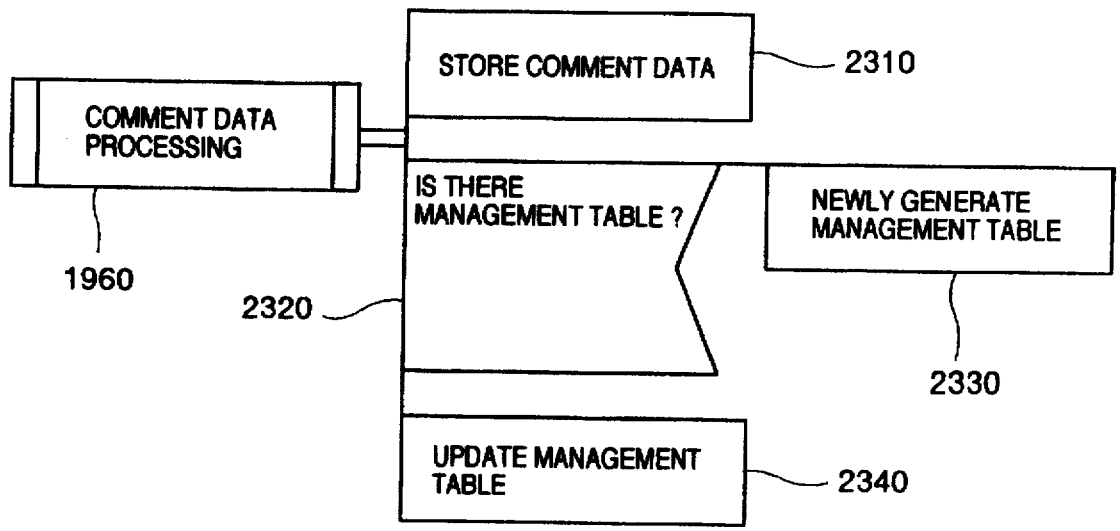
FIG. 23 is a flow chart showing a comment data processing after the closing of a comment window in each computer forming the conference support system according to the present invention.

FIG. 23 is a flow chart for explaining the comment data processing 1960 in a desired computer. In the desired computer, comment data is first stored (step 2310). Next, the judgement is made of whether or not a drawing object-comment data table 370 and/or a comment data-marker table 380 as management tables have already existed (step 2320). In the case where there is not the management table, the table is newly generated (step 2330). When the judgement processing is completed, the management table is updated (step 2340).

Figure 24:
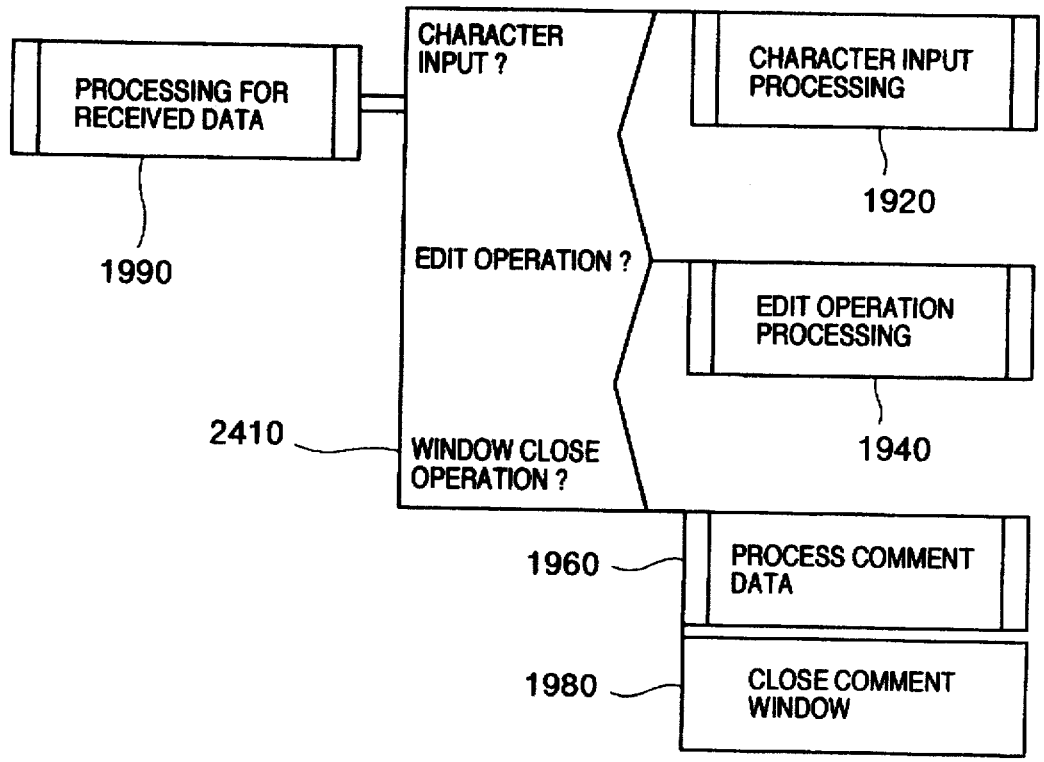
FIG. 24 is a flow chart showing a processing for data received from a conferee computer in a comment window in each computer forming the conference support system according to the present invention.

FIG. 24 is a flow chart for explaining the processing 1990 for data received by a desired computer through the communication network from a conferee computer. In the desired computer, the following judgement in step 2410 is first made. In the case of character input data from the conferee computer through the communication network, a character input processing is performed (step 1920). In the case of an edit operation from the conferee computer through the communication network, an edit operation processing is performed (step 1940). In the case of a window close operation from the conferee computer through the communication network, comment data is processed (step 1960) and a displayed comment window 123 is closed (step 1980).

Figure 25:
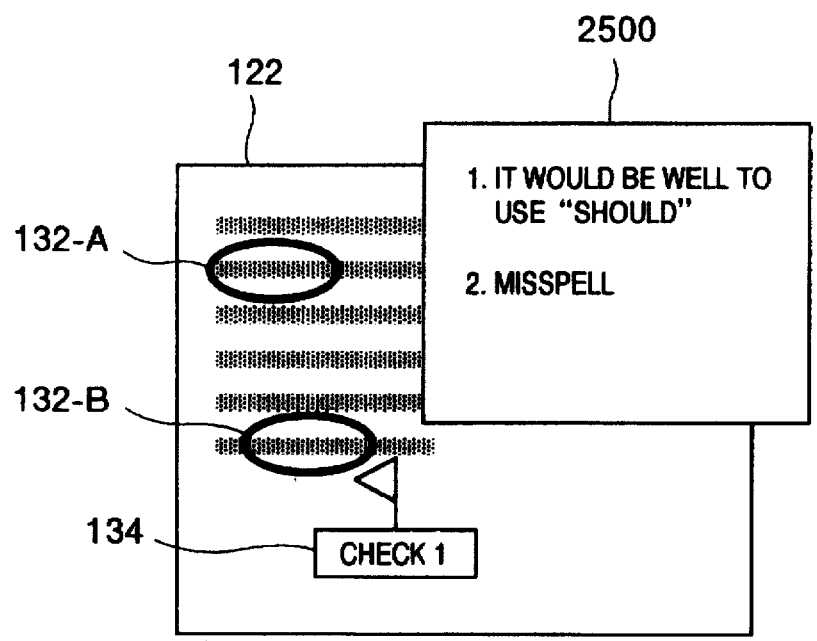
FIG. 25 is a diagram showing the display of comment data in a list form in each computer forming the conference support system according to the present invention.

FIG. 25 shows a user interface when comment data is to be displayed in a list form in a desired computer. In the desired computer, all data associated with drawing objects 132 on a shared window 122 appear on an area 2500 different from the shared window 122. In the shown example, the associated data is text data of IT WOULD BE WELL TO USE "SHOULD", MISSPELL, and so forth.

Figure 26:
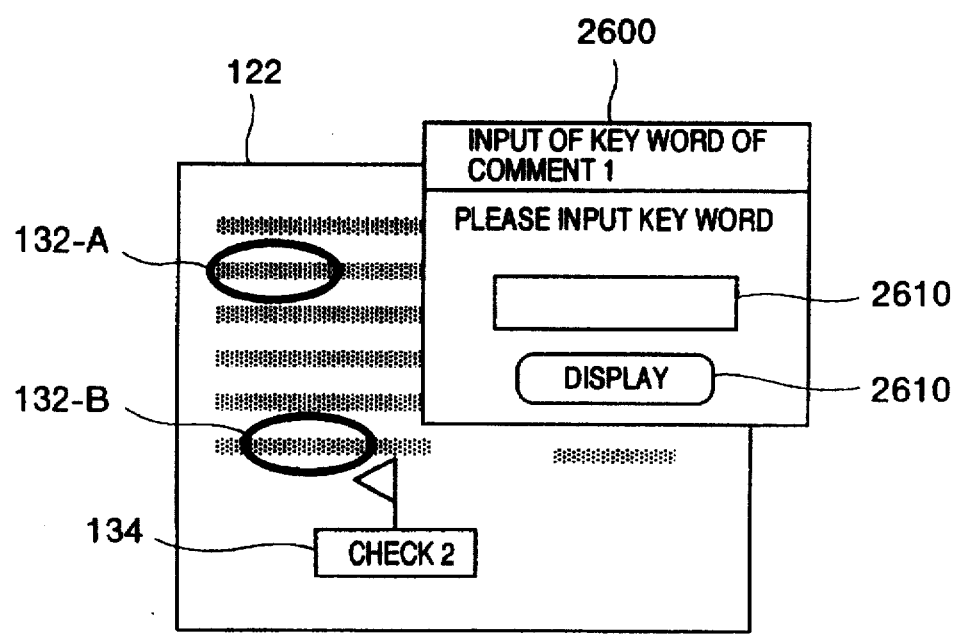
FIG. 26 is a diagram showing the display of a window for input of a keyword by a user when comment data is to be displayed in a classified form in each computer forming the conference support system according to the present invention.

FIG. 26 shows a user interface displayed by the present system when comment data is to be displayed in a classified form in a desired computer in order that a key word of classification given to a marker 122 is obtained from a user. In the desired computer, an area 2600 different from a shared window 122 includes a region 2610 for inputting the classification key word and a region 2620 for providing a function by which the present system instantaneously performs the display in a classified form in accordance with the inputted classification key word.

Figure 27:
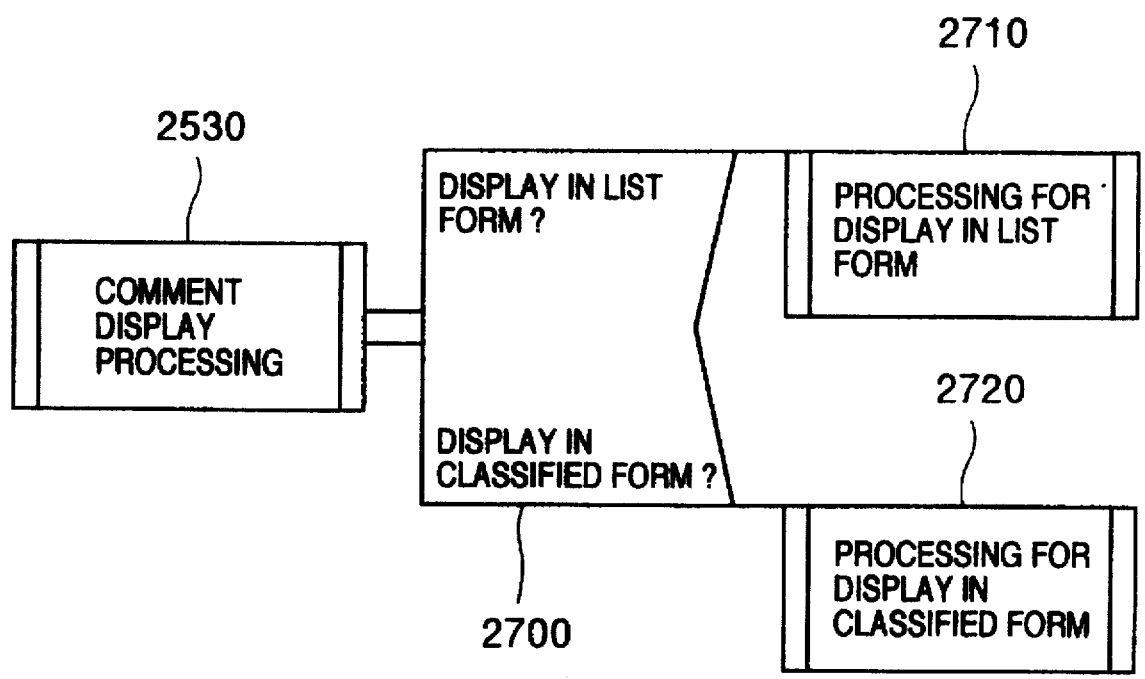
FIG. 27 is a flow chart showing a processing when comment data is to be displayed in each computer forming the conference support system according to the present invention.

FIG. 27 is a flow chart for explaining a processing 2530 for displaying comment data in a desired computer. The judgement is made whether the display is in a list form or in a classified form (step 2700). In the case of the display in a list form, a processing for display in a list form is performed (step 2710). In the case of the display in a classified form, a processing for display in a classified form is performed (step 2720).

According to the present invention, there is provided an effect that in a conference support system comprising a plurality of computers connected by a communication network and having a multi-window system function, it is possible for users to conduct a conference in such a manner that an individual intention for a drawing object is clearly given to the other participants in real time while accessing a shared partial screen area such as a shared window.

According to the present invention, there is also provided an effect that in a conference support system comprising a plurality of computers connected by a communication network and having a multi-window system function, each user can clearly give his or her individual intention for a drawing object to the other participants in real time while accessing a shared partial screen area such as a shared window and incidental data such as comments or memorandum for the drawing object at the time of a conference can be used in a clear form.

According to the present invention, there is further provided an effect that in a conference support system comprising a plurality of computers connected by a communication network and having a multi-window system function, it is possible to display comment data and marker data in association with an object drawn in a shared screen such as a shared window and to edit and reserve the data and it is therefore possible to clearly represent incidental data such as comments or memorandum for a drawing object in the shared window at the time of a conference or after the conference.

We claim:

1. A conference support system comprising a plurality of computers each of which includes a graphical user interface system and is connected by a communication network, wherein each of said plurality of computers includes:
- a storage section having an area in which object data drawn on a shared partial screen area are stored with associated data relating to said object data;
- a communication interface sharing said object data and associated data with another computer in said plurality of computers through said communication network by access operation by a user to the shared partial screen area, and
- a display control module for displaying the object data and the associated data relating to said object data, which are stored in said storage section, on an area of said display section different from said shared partial screen area of each of said plurality of computers in association with each other.

2. A conference support system according to claim 1, wherein said display control module of each of said plurality of computers causes the data associated with the object drawn on said shared partial screen area to be displayed on the area of said display section different from said shared partial screen area.

3. A conference support system according to claim 1, wherein said display control module of each of said plurality of computers causes the data associated with the object drawn on said shared partial screen area to be displayed on a window area of said display section different from said shared partial screen area.

4. A conference support system according to claim 3, wherein said window area displaying the data associated with the drawing object drawn on said shared partial screen area is popped up for said object.

5. A conference support system according to claim 3, wherein said window area displaying the data associated with the object drawn on said shared partial screen area is modeless for said shared partial screen area.

6. A conference support system according to claim 1, wherein said display control module of each of said plurality of computers includes a designating section designating the object drawn on said shared partial screen area.

7. A conference support system according to claim 1, wherein each of said plurality of computers includes an inputting section inputting the data associated with the object drawn on said shared partial screen area.

8. A conference support system according to claim 1, wherein in each of said plurality of computers includes an inputting section inputting said data, the data inputted by said inputting section is displayed on the area of said display section different from said shared partial screen area, and said display control module edits said data in accordance with the input data of said inputting section.

9. A conference support system according to claim 1, wherein in each of said plurality of computers, said display control module causes the data associated with the object drawn on said shared partial screen area is displayed on another display area of said display section different from said shared partial screen area and said object and said another display area of said data associated with said object are displayed in a form linked by a visual figure.

10. A conference support system according to claim 1, wherein in each of said plurality of computers, said display control module causes the data associated with the object drawn on said shared partial screen area to be displayed on an area of said display section different from said shared partial screen area and the display of said data is changed over between an undisplayed condition and a displayed condition.

11. A conference support system according to claim 1, wherein each of said plurality of computers includes a central control module causes an operation for the display of the data associated with the object drawn on said shared partial screen area to be changed over between a condition in which said plurality of computers interlock with each other and a condition in which said plurality of computers do not interlock with each other.

12. A conference support system comprising a window system formed by a plurality of computers connected by a communication network, wherein each of said plurality of computers comprises:
- display means for displaying a common image on a screen area shared through said communication network,
- designating means for designating an object displayed on the shared screen area of said display means,
- inputting means for inputting comment data relating to the object designated by said designating means,
- storing means for storing the comment data inputted by said inputting means, the comment data being stored in correspondence with the object designated by said designating means,
- display control means for displaying the object designated by said designating means and the comment data relating to the object, which are stored in said storing means, on said display means in association with each other,
- communication control means for transmitting and receiving said object data and said comment data to and from another computer in said plurality of computers in association with each other so that said object and said comment data stored in said storing means are used in common through said communication network, and
- central processing means for controlling said display means, said designating means, said inputting means, said storing means, said display control means and said communication control means.

13. A conference support system comprising a window system formed by a plurality of computers connected by a communication network, wherein each of said plurality of computers comprises:
- a display means for displaying a common image on a screen area shared through said communication network,
- designating means for designating an object displayed on the shared screen area of said display means,
- inputting means for inputting comment data relating to the object designated by said designating means,
- storing means for storing the comment data inputted by said inputting means, the comment data being stored in correspondence with the object designated by said designating means,
- display control means for displaying the object designated by said designating means and the comment data relating to the object, which are stored in said storing means, on said display means in association with each other, and
- communication control means for transmitting and receiving said object data and said comment data to and from another computer in said plurality of computers in association with each other so that said object and said comment data stored in said storing means are used in common through said communication network, and wherein graphic data indicating said object in association with said object is used in common through said communication network.

14. A conference support system comprising a window system formed by a plurality of computers connected by a communication network, wherein each of said plurality of computers comprises:

display means for displaying a common image on a screen area shared through said communication network, designating means for designating an object displayed on the shared screen area of said display means, inputting means for inputting comment data or graphic data relating to the object designated by said designating means, storing means for storing the comment data or graphic data inputted by said inputting means, the omment data being stored in correspondence with the object designated by said designating means, display control means for displaying the object designated by said designating means and the comment data or the graphic data related to the object, which are stored in said storing means, adjacent to said object data on said display means in association with each other, communication control means for transmitting and receiving said object data and said comment data or said graphic data to and from another computer in said plurality of computers in association with each other so that said object and said comment data or said graphic data stored in said storing means are used in common through said communication network, and central processing means for controlling said display means, said designating means, said inputting means, said storing means, said display control means and said communication control means.

15. A conference support system according to claim 14, wherein said central processing means controls editing of said comment data inputted by said inputting means relating to said object data designated by said designating means.

16. A conference support system according to claim 14, wherein said central means editing of said graphic data inputted by said inputting means relating to said object data designated by said designating means.

17. A conference support system comprising a window system formed by a plurality of computers connected by a communication network, wherein each of said plurality of computers comprises:

display means for displaying a common image on a screen area shared through said communication network, designating means for designating an object displayed on the shared screen area of said display means, inputting means for inputting comment data relating to the object designated by said designating means, storing means for storing the comment data inputted by said inputting means, the comment date being stored in correspondence with the object designated by said designating means so that said object and said comment data stored in said storing means are used in common through said communication network, and display control means for displaying the comment data relating to said object on a screen of said display means having the shared screen area in a form changed over between a condition in which said plurality of computers interlock with each other and a condition in which said plurality of computers do not interlock with each other.

* * * * *